W. M. BEST.
TIRE SHRINKING IMPLEMENT.
APPLICATION FILED DEC. 22, 1913.
1,097,909.
Patented May 26, 1914.
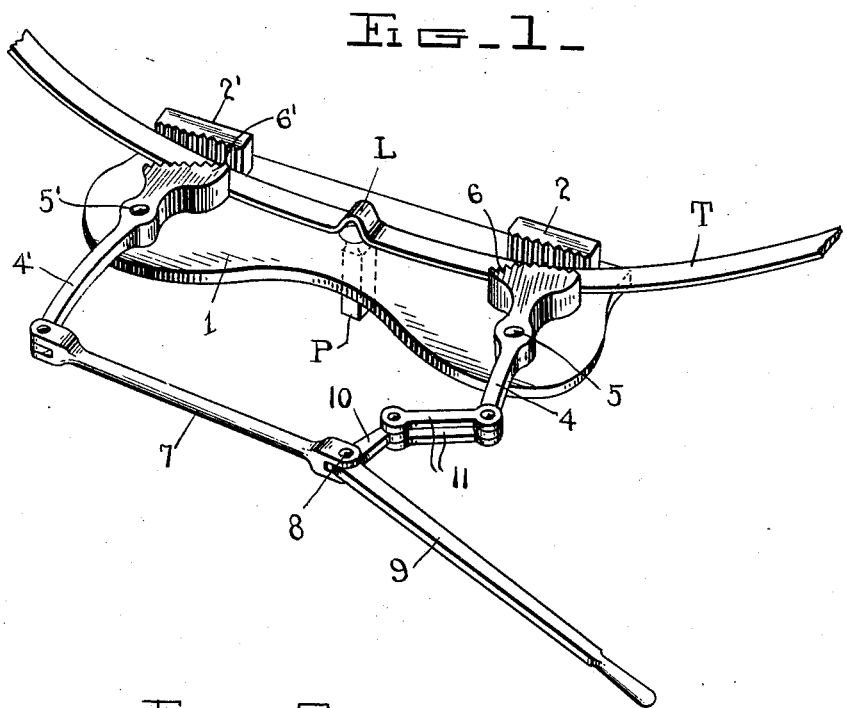
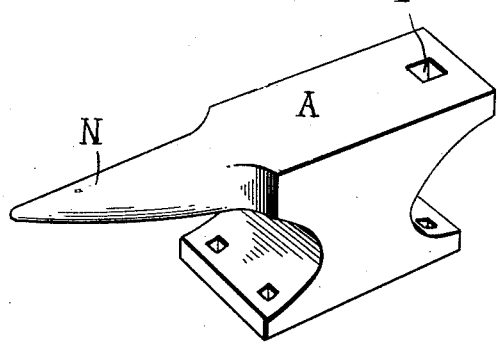
Witnesses
L. B. James
J. H. Hayes
Inventor
William M. Best
By George W. Upton
Attorney

UNITED STATES PATENT OFFICE.

WILLIAM M. BEST, OF WARREN, OHIO.

TIRE-SHRINKING IMPLEMENT.

1,097,909. Specification of Letters Patent. Patented May 26, 1914.

Application filed December 22, 1913. Serial No. 808,093.

*To all whom it may concern:*

Be it known that I, WILLIAM M. BEST, a citizen of the United States of America, residing at Warren, in the county of Trumbull and State of Ohio, have invented certain new and useful Improvements in Tire-Shrinking Implements, of which the following is a specification.

My invention relates to improvements in implements for the use of blacksmiths when shrinking vehicle tires; and the objects of my invention are, first, to provide means for holding a heated tire in an upright position on an anvil and, second, to provide means for retaining the implement and the tire in position and leave the blacksmith the free use of both of his hands. I attain those objects by the mechanism illustrated in the accompanying drawings, in which:—

Figure 1 shows my invention, in perspective, grasping a tire the upper portion of which is broken away, and Fig. 2 shows an anvil in connection with which my improvement is used.

Similar characters refer to similar parts throughout the views.

To the bottom of a flat metal plate 1, of convenient form, as shown, and perpendicular to it I rigidly attach a peg P, shaped so as to snugly fit into the hardy hole H, of an anvil, A. The flat under-surface of the plate 1 and the peg P, serve to keep the implement in suitable position for its operation. The operator can, however, lift the implement readily and put it out of the way after use. On the plate 1 and made as parts thereof I attach: fixed jaw members 2 and 2', near the outer ends of said plate and at its rear edge, and having vertical corrugations on their front faces. To coöperate with said members 2 and 2', I provide corresponding jaws 6 and 6', corrugated on their rear, vertical faces and made as terminals of levers 4 and 4', which lie parallel to the plate 1 and are fulcrumed on pivots 5 and 5', respectively attached rigidly to plate 1 near its outer edge and its ends. A toggle arm 7 is pivoted at one end to the outer end of lever 4' and at the other end to a lever elbowed at 8 and comprising an arm 9 and an angled member, 10, connected by a link 11 pivoted to said member 10 and to the outer end of lever 4.

In practice the blacksmith places the implement on the anvil so the plate 1 rests on its top and the peg P fits into the hardy hole H. He then sufficiently heats the tire T, and, resting it in a vertical position on the nose N of the anvil A; shapes a slight upward loop L in the tire and immediately transfers the tire T on to the plate 1 and, by pressing the arm 9 with his right leg, he draws the jaws 2, 6, and 2', 6', together till they firmly grasp the tire and hold it in an upright position, at the same time retaining a hold on the tire, with his left hand, while with the hammer still in his right hand he welds the accumulated metal at the loop L so as to draw it together and reduce the circumference of the tire.

Slight mechanical changes such as the substitution of single rods with forked ends for the double piece shown as forming the link or other parts can be made without departing from my invention.

I claim:

In combination, a plate adapted to be positioned on an anvil and provided with a pin to enter the anvil, a pair of tire engaging jaws fixed on the plate in spaced relation to each other and each provided with teeth, a long lever pivoted between its ends to the plate and provided with a tire jaw on its inner end to force a tire against the adjacent fixed jaw, a short lever pivoted between its ends to the plate and provided with a jaw on its inner end to force a tire against the other fixed jaw, a long link pivoted at one end to the outer end of the long lever, a short link pivoted at one end to the outer end of the short lever, and an operating lever pivoted to the other end of the long link and provided with an angular end pivoted to the other end of the short link and adapted to operate said long and short levers to move the jaws into tire gripping and shrinking positions simultaneously or to move said levers out of said positions simultaneously.

In testimony whereof I affix my signature in presence of two witnesses.

WILLIAM M. BEST.

Witnesses:
PEGGY BETHUNE,
J. F. HAYES.

Copies of this patent may be obtained for five cents each, by addressing the "Commissioner of Patents, Washington, D. C."